US012719196B2

United States Patent

Miyamura

(10) Patent No.: US 12,719,196 B2
(45) Date of Patent: Aug. 25, 2026

(54) JOINT CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tetsuya Miyamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 353 days.

(21) Appl. No.: 18/687,046

(22) PCT Filed: Aug. 19, 2022

(86) PCT No.: PCT/JP2022/031348
§ 371 (c)(1),
(2) Date: Feb. 27, 2024

(87) PCT Pub. No.: WO2023/032709
PCT Pub. Date: Mar. 9, 2023

(65) Prior Publication Data

US 2024/0356262 A1 Oct. 24, 2024

(30) Foreign Application Priority Data

Sep. 6, 2021 (JP) ................................. 2021-144528

(51) Int. Cl.
*H01R 13/42* (2006.01)
*H01R 13/422* (2006.01)
(Continued)

(52) U.S. Cl.
CPC ..... *H01R 13/4223* (2013.01); *H01R 13/4362* (2013.01); *H01R 13/516* (2013.01); *H01R 13/7193* (2013.01); *H01R 2107/00* (2013.01)

(58) Field of Classification Search
CPC ........................ H01R 13/4223; H01R 13/4362
(Continued)

(56) References Cited

U.S. PATENT DOCUMENTS 5,201,667 A * 4/1993 Endo ...................... H01R 31/08 439/189
5,575,684 A 11/1996 Uchida et al.
(Continued)

FOREIGN PATENT DOCUMENTS

JP H06-215824 A 8/1994
JP 2012-221907 A 11/2012

OTHER PUBLICATIONS

International Search Report issued on Oct. 4, 2022 for WO 2023/032709 A1 (4 pages).

*Primary Examiner* — Phuong K Dinh
(74) *Attorney, Agent, or Firm* — Venjuris, P.C.

(57) ABSTRACT

It is aimed to provide a joint connector excellent in workability. A joint connector (1) is provided with a housing (10) including a plurality of locking lances (13), a plurality of terminal fittings (30) to be inserted into the housing (10) from behind the housing (10) and retained by a locking action of the plurality of locking lances (13), a joint terminal (50) to be mounted into the housing (10) from front for making the plurality of terminal fittings (30) conductive, and a holding member (80) for holding the joint terminal (50), the holding member being mounted into the housing (10) to cover a front surface of the housing (10). Jig insertion chambers (16) open in a rear surface of the housing (10) are formed in the housing (10). The locking lance (13) includes
(Continued)

a jig contact portion (13A) arranged in the jig insertion chamber (16).

7 Claims, 15 Drawing Sheets

(51) Int. Cl.
*H01R 13/436* (2006.01)
*H01R 13/516* (2006.01)
*H01R 13/7193* (2011.01)
*H01R 107/00* (2006.01)

(58) Field of Classification Search
USPC .................................................. 439/595, 752
See application file for complete search history.

(56) References Cited

U.S. PATENT DOCUMENTS

| | | | |
|---|---|---|---|
| 6,276,964 | B1 | 8/2001 | Shinozaki |
| 2019/0109416 | A1 | 4/2019 | Tsukamoto |
| 2019/0109418 | A1 | 4/2019 | Tsukamoto |

* cited by examiner

JOINT CONNECTOR

CROSS REFERENCE TO RELATED APPLICATIONS

This application is a national phase of PCT application No. PCT/JP2022/031348, filed on 19 Aug. 2022, which claims priority from Japanese patent application No. 2021-144528, filed on 6 Sep. 2021, all of which are incorporated herein by reference.

TECHNICAL FIELD

The present disclosure relates to a joint connector.

BACKGROUND

Patent Document 1 discloses a joint connector including a connector housing and a terminal fitting accommodated in the connector housing. A general-purpose connector connected to a sub harness is connected to the joint connector. A plurality of terminals connected to a plurality of wires constituting the sub harness are accommodated in the general-purpose connector. If the joint connector and the general-purpose connector are connected, the plurality of terminals of the general-purpose connector are connected to the terminal fitting and conductively connected via the terminal fitting.

PRIOR ART DOCUMENT

Patent Document

Patent Document 1: JP 2012-221907 A

SUMMARY OF THE INVENTION

Problems to be Solved

To remove the terminal of the general-purpose connector for maintenance or the like, the retained terminal is released by inserting a jig through the front surface of the general-purpose connector, i.e. a surface facing the joint connector. However, to release the retained terminal, the general-purpose connector needs to be separated from the joint connector beforehand. Thus, workability is not good.

A joint connector of the present invention was completed on the basis of the above situation and it is aimed to provide a joint connector excellent in workability.

Means to Solve the Problem

The present disclosure is directed to a joint connector with a housing including a plurality of locking lances, a plurality of terminal fittings to be inserted into the housing from behind the housing, the plurality of terminal fittings being retained by a locking action of the plurality of locking lances, a joint terminal to be mounted into the housing from front, the joint terminal making the plurality of terminal fittings conductive, and a holding member for holding the joint terminal, the holding member being mounted into the housing to cover a front surface of the housing, jig insertion chambers open in a rear surface of the housing being formed in the housing, and the locking lance including a jig contact portion arranged in the jig insertion chamber.

Effect of the Invention

According to the present disclosure, a joint connector can be made excellent in workability.

DETAILED DESCRIPTION TO EXECUTE THE INVENTION

Description of Embodiments of Present Disclosure

Figure 1:
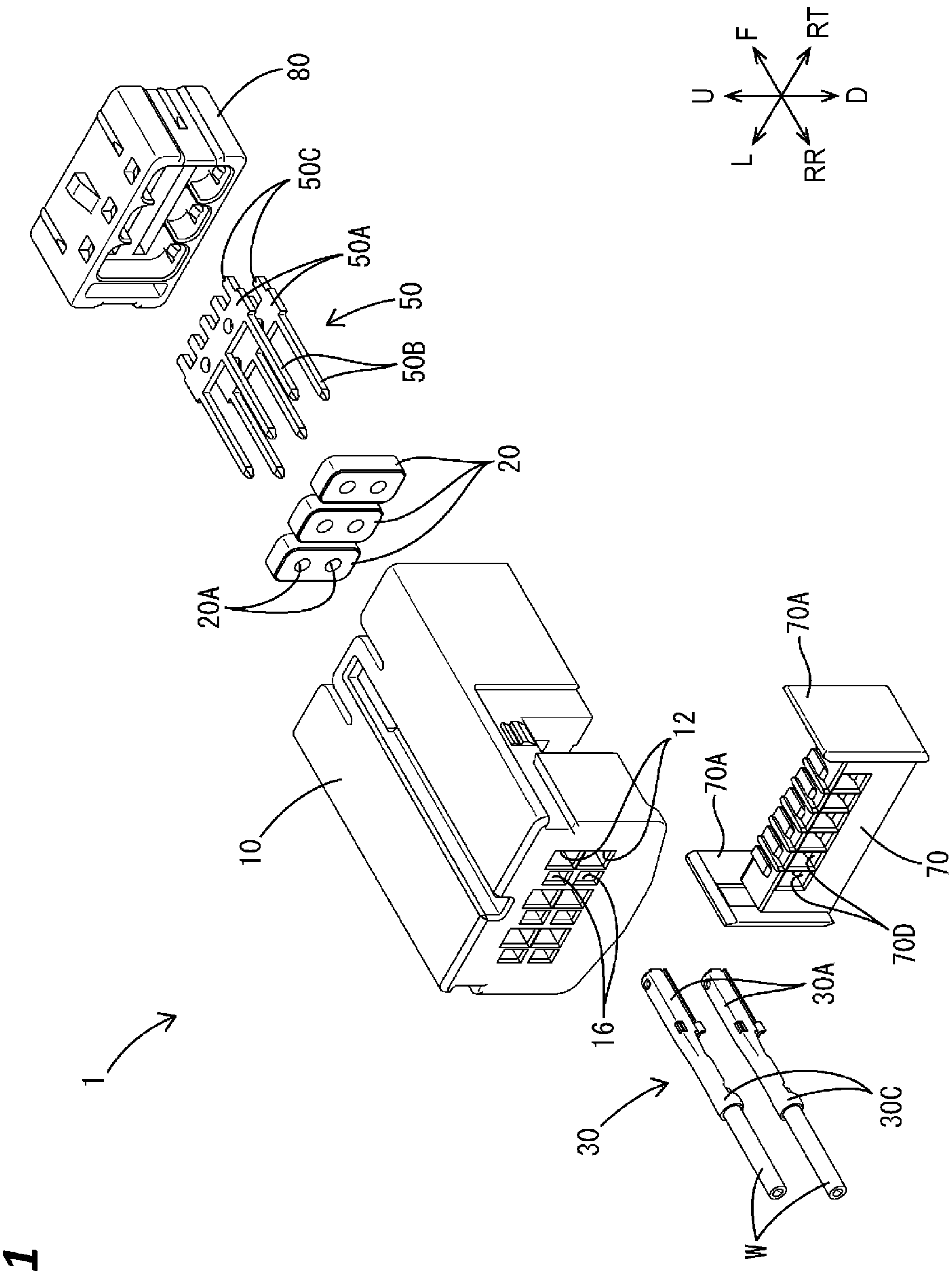
FIG. 1 is a perspective view showing a joint connector of an embodiment in a disassembled state.
Figure 2:
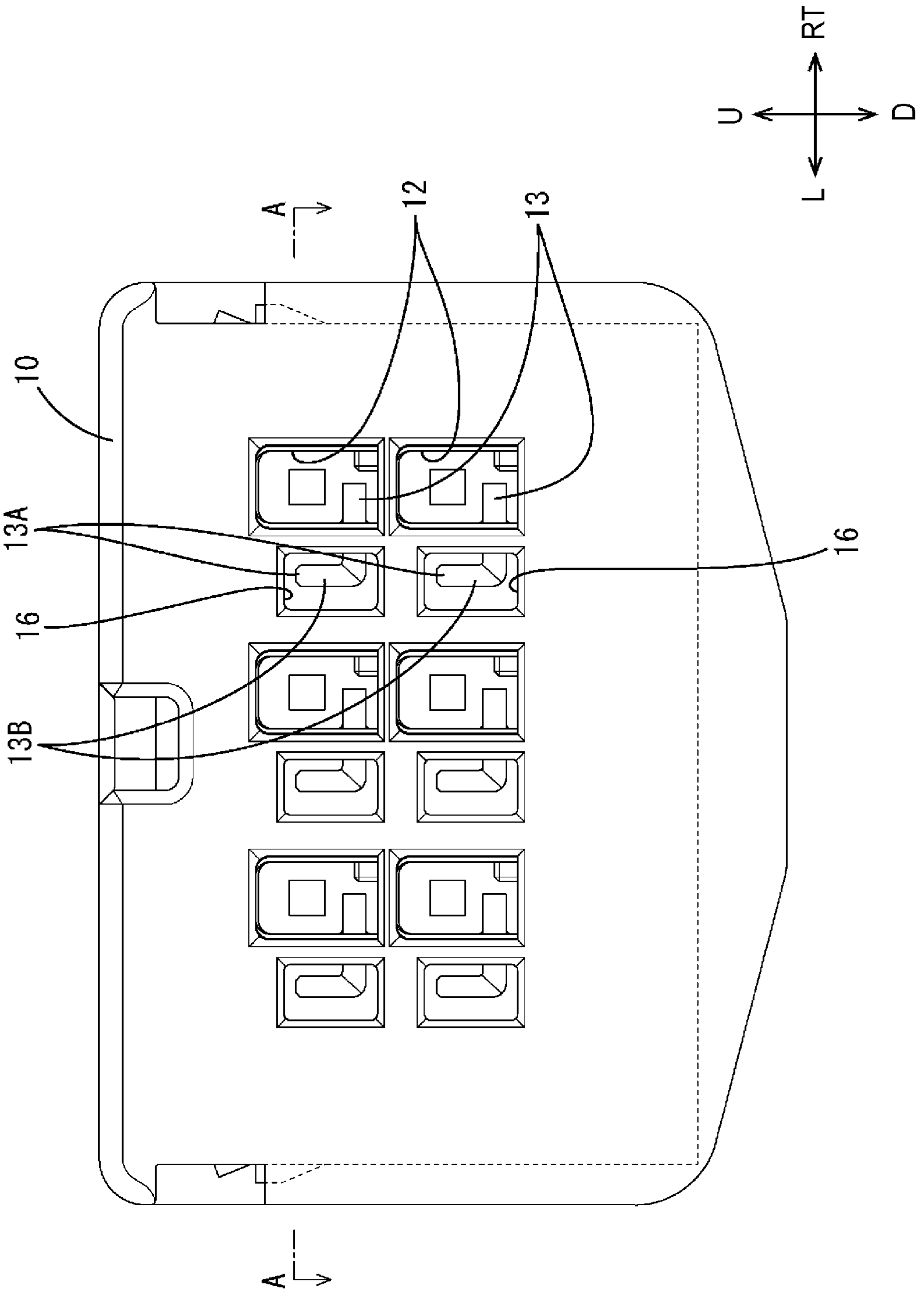
FIG. 2 is a back view of a housing.

First, embodiments of the present disclosure are listed and described.

(1) The joint connector of the present disclosure is provided with a housing including a plurality of locking lances, a plurality of terminal fittings to be inserted into the housing from behind the housing, the plurality of terminal fittings being retained by a locking action of the plurality of locking lances, a joint terminal to be mounted into the housing from front, the joint terminal making the plurality of terminal fittings conductive, and a holding member for holding the joint terminal, the holding member being mounted into the housing to cover a front surface of the housing, jig insertion chambers open in a rear surface of the housing being formed in the housing, and the locking lance including a jig contact portion arranged in the jig insertion chamber. According to this configuration, in releasing the terminal fitting locked by the locking lance, a jig inserted into the jig insertion chamber from behind the housing is brought into contact with the jig contact portion of the locking lance to displace the locking lance in a direction to disengage the locking lance from the terminal fitting. Since the holding member needs not be removed from the housing, workability is excellent.

(2) Preferably, the jig contact portion is formed with a guide surface inclined with respect to a front-rear direction. According to this configuration, the jig inserted into the jig insertion chamber can be prevented from butting against the jig contact portion.

(3) Preferably, a retainer displaceable between a temporary locking position for allowing the terminal fittings to be inserted into the housing and a complete locking position for retaining the terminal fittings inserted into the housing is mounted in the housing, and the retainer is formed with insertion restricting portions for restricting contact of a jig with the jig contact portion by being located in the jig insertion chamber when the retainer is at the complete locking position and allowing the contact of the jig with the jig contact portion when the retainer is at the temporary locking position. There is a concern that a locked part of the terminal fitting and the retainer is deformed or broken if an attempt is made to release retention by the locking lance and withdraw the terminal fitting rearward with the retainer located at the complete locking position. As a countermeasure against this, the retainer is formed with the insertion restricting portions. In this way, if the jig is inserted into the jig insertion chamber with the retainer located at the complete locking position, the contact of the jig with the jig contact portion is restricted, wherefore an unlocking operation of the locking lance cannot be performed. Therefore, an operation of withdrawing the terminal fitting can be prevented with the retainer kept at the complete locking position.

(4) Preferably, the joint terminal includes tabs to be individually connected to the plurality of terminal fittings, and ferrite cores are externally fit to the tabs and parts of the ferrite cores and at least parts of the jig insertion chambers are arranged to overlap in a front view of the housing. According to this configuration, intervals between the adjacent terminal fittings are widened by forming the jig insertion chambers. The ferrite cores can be arranged, utilizing these widened intervals. Thus, enlargement caused by providing the ferrite cores can be avoided.

(5) Preferably in (4), the plurality of terminal fittings are arranged side by side along a first direction orthogonal to a front-rear direction and separately in two rows in a second direction orthogonal to the front-rear direction and the first direction, and a pair of the terminal fittings arranged along the second direction constitute one differential pair transmission line and one ferrite core is mounted on a pair of the tabs to be connected to the pair of terminal fittings constituting the differential pair transmission line. According to this configuration, the plurality of ferrite cores can be arranged side by side in a row along the first direction, and the layout of the ferrite cores can be simplified.

(6) Preferably in (5), a displacement direction when the locking lance is disengaged from the terminal fitting is a direction parallel to the first direction. According to this configuration, since an interval between the pair of terminal fittings constituting the differential pair transmission line can be narrowed, the ferrite core can be reduced in size.

(7) Preferably in (6), the jig contact portion is arranged between the terminal fittings adjacent in the first direction. According to this configuration, since intervals between the terminal fittings adjacent in the first direction can be ensured, sufficient dimensions in the first direction of the ferrite cores can be ensured while the mutual contact of the ferrite cores arranged in the first direction is avoided. In this way, noise filter performance by the ferrite cores can be enhanced.

DETAILS OF EMBODIMENT OF PRESENT DISCLOSURE

Embodiment

One embodiment of a technique disclosed in this specification is described with reference to FIGS. 1 to 15. In the following description, upper and lower sides shown in FIG. 1 are directly defined as upper and lower sides concerning a vertical direction. Right and left sides in FIG. 1 are defined as front and rear sides concerning a front-rear direction. A forward direction is a direction in which a holding member 80 is located with respect to a housing 10. Back and frontal sides in FIG. 1 are defined as left and right sides concerning a lateral direction.

A joint connector 1 of this embodiment is provided with the housing 10, a retainer 70, a plurality of terminal fittings 30, the holding member 80, a plurality of joint terminals 50 and a plurality of ferrite cores 20 as shown in FIG. 1.

[Concerning Housing]

The housing 10 is made of synthetic resin. The housing 10 is substantially in the form of a block. The housing 10 is formed with a plurality of cavities 12 penetrating in the front-rear direction. One terminal fitting 30 is inserted into each cavity 12. Two cavities 12 in upper and lower stages constitute one set, and three sets of the cavities 12 are arranged in the lateral direction.

Figure 3:
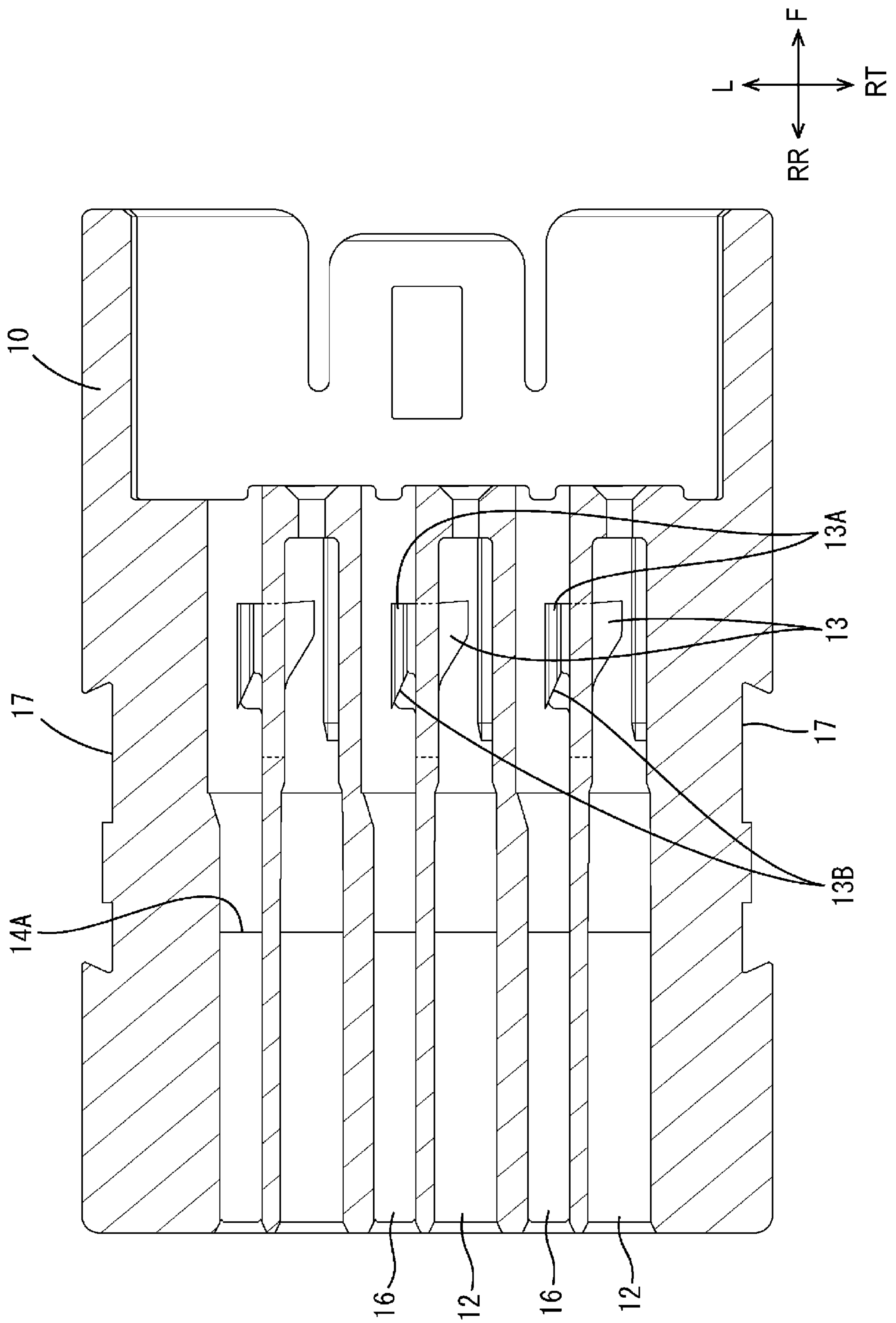
FIG. 3 is a section along A-A in FIG. 2.

A jig insertion chamber 16 penetrating in the front-rear direction is formed to the left of each cavity 12. The jig insertion chamber 16 is open in the rear surface of the housing 10. A jig 90 is inserted into the jig insertion chamber 16 from behind. As shown in FIG. 3, one locking lance 13 resiliently deformable in the lateral direction is provided over each cavity 12 and each jig insertion chamber 16 in the housing 10. That is, the housing 10 includes a plurality of the locking lances 13. Each locking lance 13 projects into the corresponding cavity 12.

Figure 4:
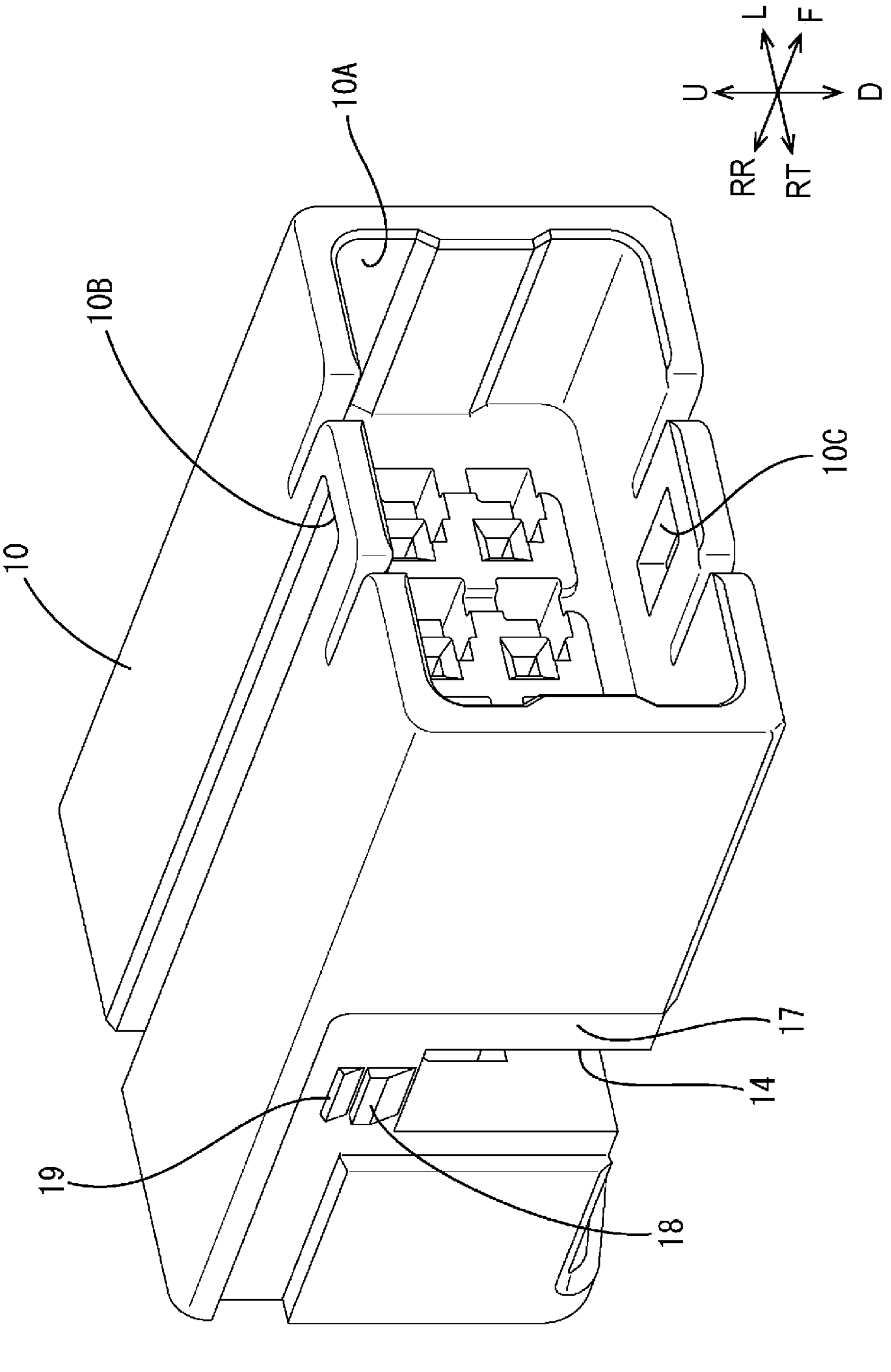
FIG. 4 is a perspective view of the housing when viewed obliquely from a front right upper side.

Each locking lance 13 includes a jig contact portion 13A. The jig contact portion 13A is arranged in the jig insertion chamber 16. The jig contact portion 13A is coupled to a left edge part of the locking lance 13 and rises upward (see FIG. 2). A guide surface 13B inclined with respect to the front-rear direction is formed on a rear side of the jig contact portion 13A. Specifically, the guide surface 13B is facing obliquely rearward toward the right and inclined forward toward the right. As shown in FIG. 4, a receptacle 10A in the form of a rectangular tube projecting forward is provided on a front side of the housing 10. Lock holes 10B, 10C penetrating in the vertical direction are formed in tip parts of the upper and lower walls of the receptacle 10A.

A mounting groove 14 recessed upward is formed from a right end to a left end in a central part in the front-rear direction of a lower side of the housing 10. The mounting groove 14 is arranged behind the respective locking lances 13 (see FIG. 3). The mounting groove 14 communicates with the respective cavities 12. The retainer 70 is mounted into the mounting groove 14. Recessed surface portions 17 recessed from the surrounding are formed in both side surfaces in the lateral direction of the housing 10 (see FIG. 3). A temporary locking portion 18 and a complete locking portion 19 are provided to project outward in the lateral direction in the recessed surface portion 17 (see FIGS. 5 and 6). The temporary locking portion 18 and the complete locking portion 19 are arranged above the mounting groove 14 in the recessed surface portion 17. The complete locking portion 19 is arranged above the temporary locking portion 18 in the recessed surface portion 17.

[Concerning Retainer]

Figure 5:
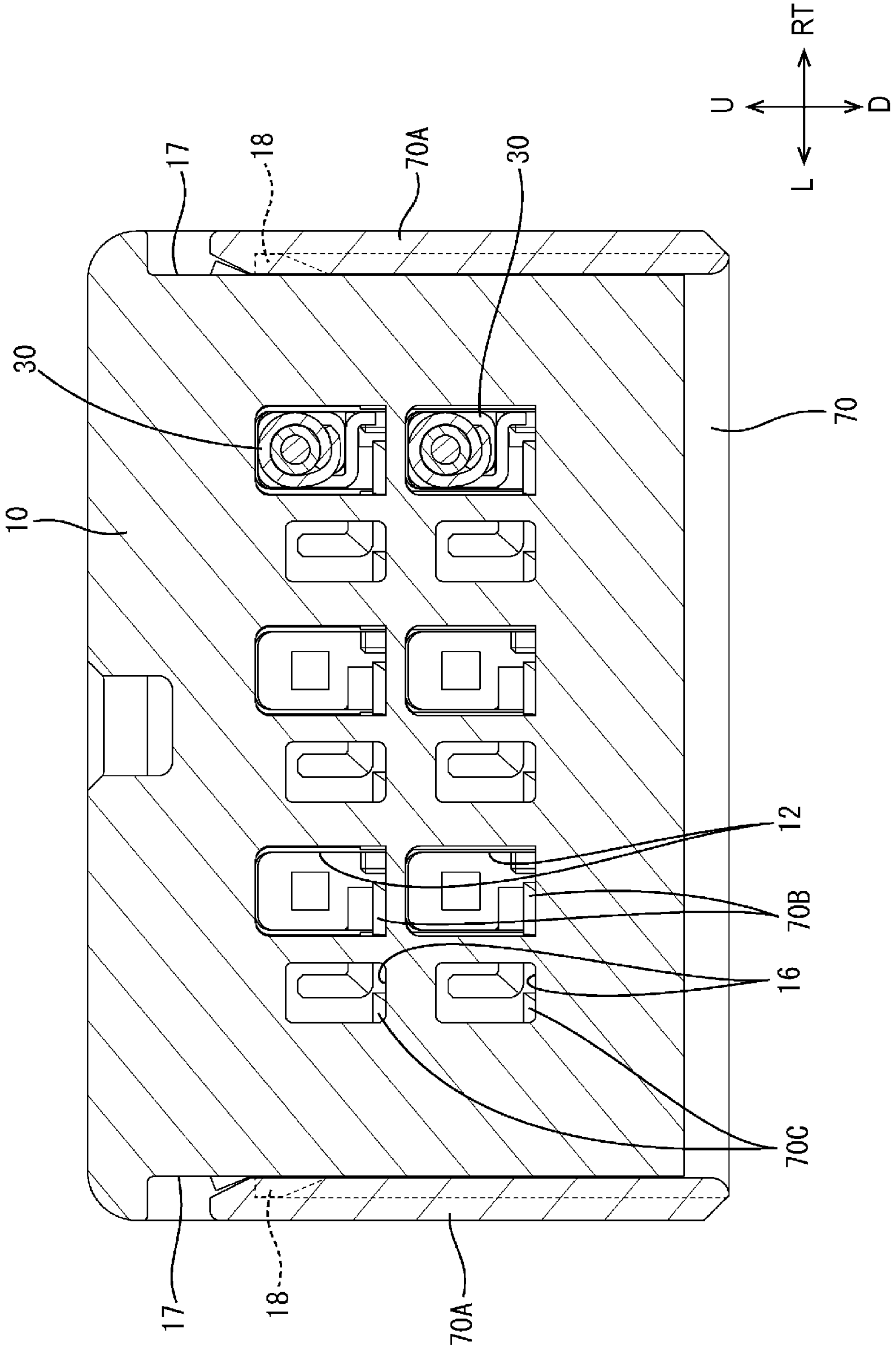
FIG. 5 is a transverse section of the housing with a retainer located at a temporary locking position.
Figure 6:
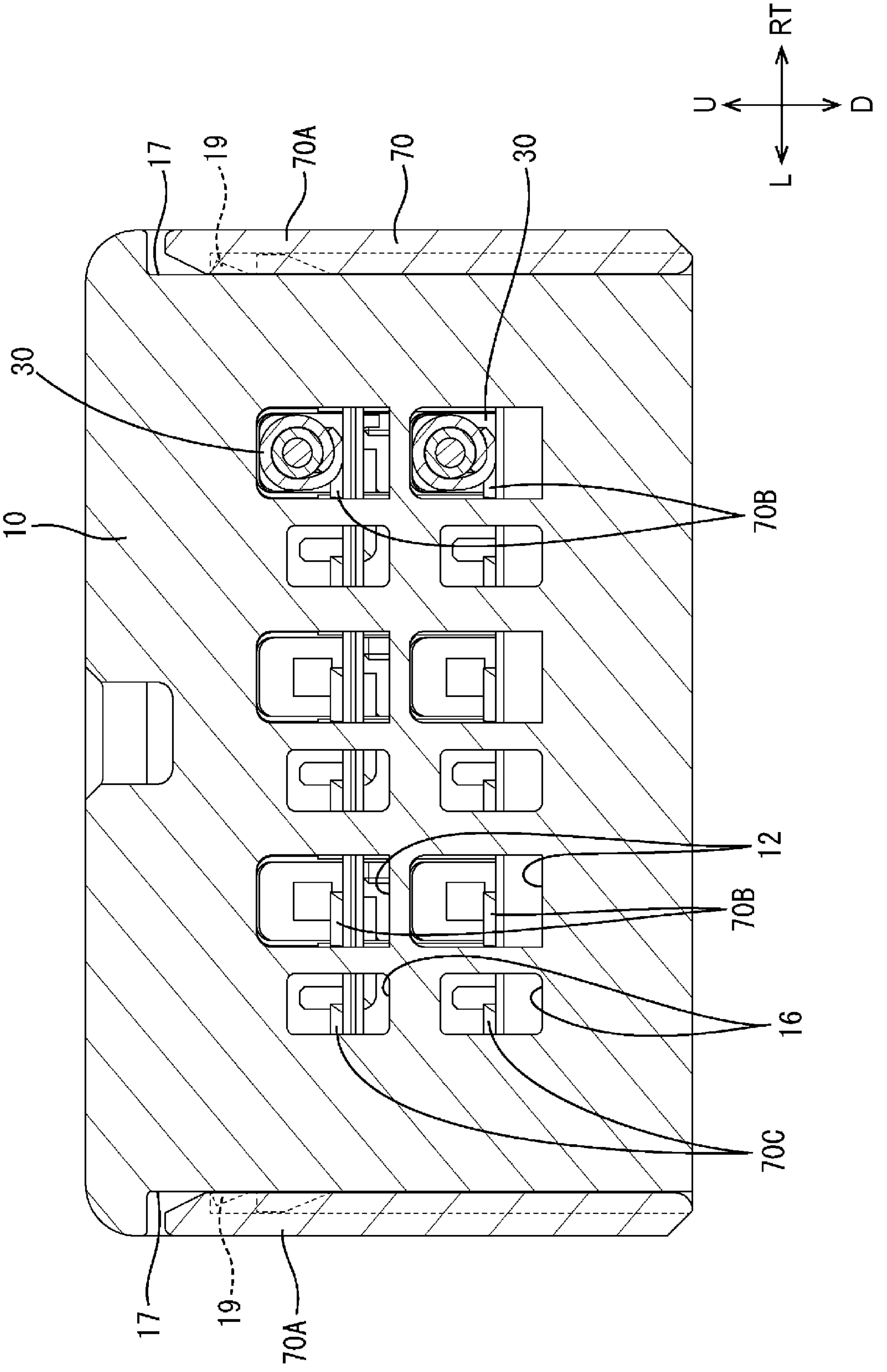
FIG. 6 is a transverse section of the housing with the retainer located at a complete locking position.

The retainer 70 is made of synthetic resin. As shown in FIG. 1, the retainer 70 is in the form of a block extending in the lateral direction. Guide portions 70A extending in the upward direction and front-rear direction are formed on both end parts in the lateral direction of the retainer 70. As shown in FIGS. 5 and 6, the retainer 70 is inserted into the mounting groove 14 along the recessed surface portions 17 of the housing 10 from below the housing 10. If the guide portions 70A of the retainer 70 are locked to the temporary locking portions 18, the retainer 70 is held at a temporary locking position with respect to the housing 10 (see FIG. 5). If the guide portions 70A of the retainer 70 are locked to the complete locking portions 19, the retainer 70 is held at a complete locking position with respect to the housing 10 (see FIG. 6). The retainer 70 is mounted to the housing 10 displaceably between the temporary locking position and the complete locking position.

The retainer 70 is formed with a plurality of through holes 70D corresponding to the cavities 12 and the jig insertion chambers 16 in the lower stage (see FIG. 1). The retainer 70 is provided with a plurality of retaining portions 70B and a plurality of insertion restricting portions 70C projecting upward at positions corresponding to the respective cavities 12 and jig insertion chambers 16 in the upper stage and at positions corresponding to the respective cavities 12 and jig insertion chambers 16 in the lower stage. The respective retaining portions 70B are arranged at positions facing the respective cavities 12 from below when the retainer 70 is inserted into the mounting groove 14. The respective insertion restricting portions 70C are arranged at positions facing the respective jig insertion chambers 16 from below when the retainer 70 is inserted into the mounting groove 14.

When the retainer 70 is at the temporary locking position, the insertion restricting portions 70C are in a retracted state by being located in lower end parts of the jig insertion chambers 16 and the retaining portions 70B are in a retracted state by being located in lower end parts of the cavities 12 (see FIG. 5). In this way, the jig 90 is allowed to contact the jig contact portion 13A of the locking lance 13 when the jig 90 is inserted into the jig insertion chamber 16 from behind the housing 10. Simultaneously, the terminal fitting 30 is allowed to be inserted into the cavity 12.

When the retainer 70 is at the complete locking position, the insertion restricting portions 70C are in an advanced state by being located in vertical central parts of the jig insertion chambers 16 and the retaining portions 70B are in an advanced state by being located in vertical central parts of the cavities 12 (see FIG. 6). In this way, when the jig 90 is inserted into the jig insertion chamber 16 from behind the housing 10, the retainer 70 restricts the contact of the jig 90 with the jig contact portion 13A of the locking lance 13. Simultaneously, the retainer 70 retains the terminal fittings 30 inserted into the cavities 12.

[Concerning Terminal Fitting]

Figure 7:
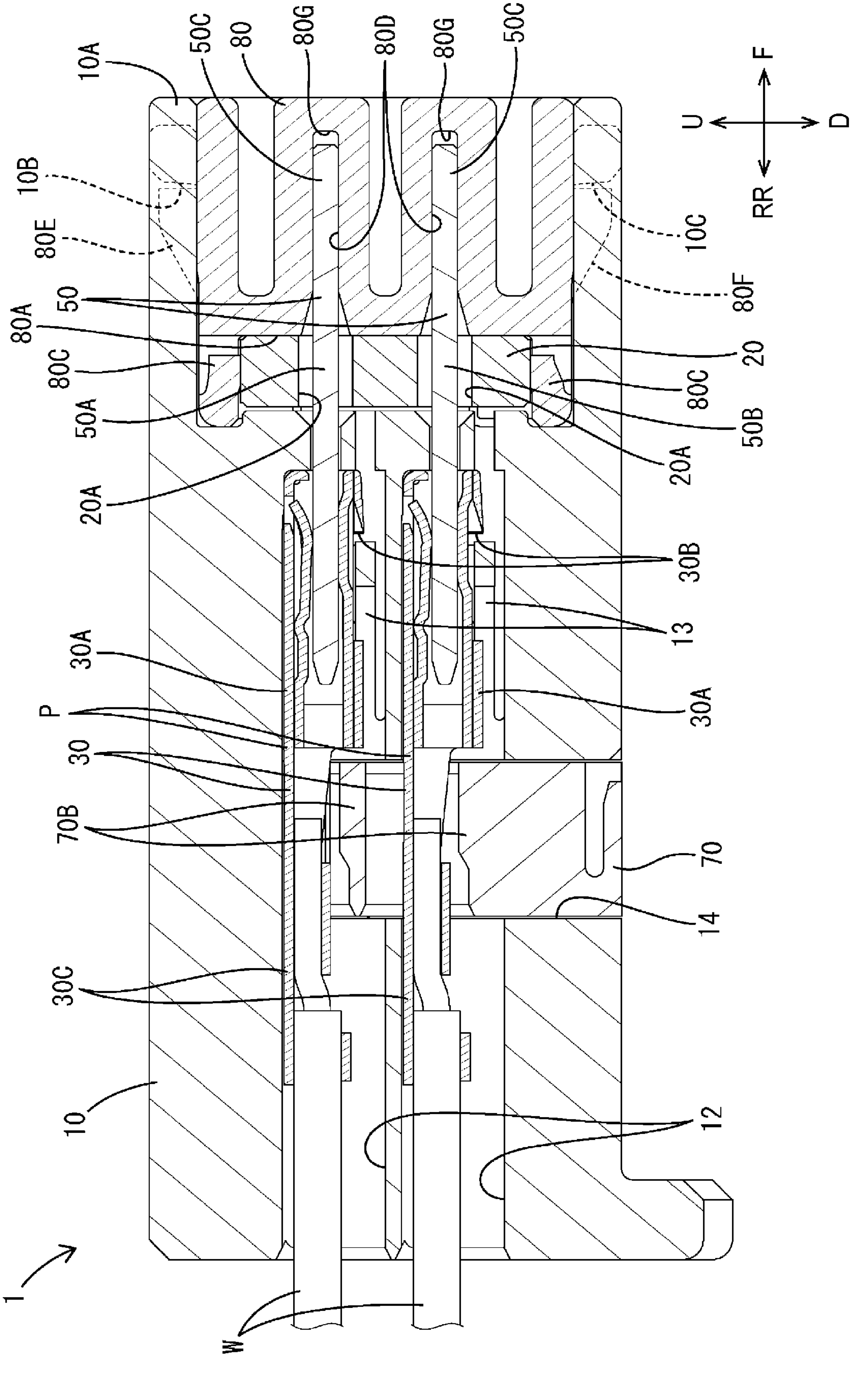
FIG. 7 is a side view in section of the joint connector of the embodiment.

The terminal fitting 30 is made of metal. As shown in FIG. 1, the terminal fitting 30 is elongated in the front-rear direction. The terminal fitting 30 includes a box-shaped connecting portion 30A in a front part. A tab 50B of the joint terminal 50 is inserted into the connecting portion 30A from front. As shown in FIG. 7, a locking recess 30B recessed upward is formed in a central part in the front-rear direction of the lower wall of the connecting portion 30A. The terminal fitting 30 is primarily retained by the entrance of the locking lance 13 into the locking recess 30B from left (see FIG. 11). Further, the terminal fitting 30 is secondarily retained by locking the retaining portion 70B of the retainer 70 inserted into the mounting groove 14 and held at the complete locking position to a lower side of the rear end of the connecting portion 30A.

The terminal fitting 30 is provided with a barrel portion 30C extending rearward from the rear end of the connecting portion 30A. The barrel portion 30C is crimped and connected to a wire W. The wire W is pulled out to outside through the rear surface of the housing 10.

[Concerning Holding Member]

Figure 8:
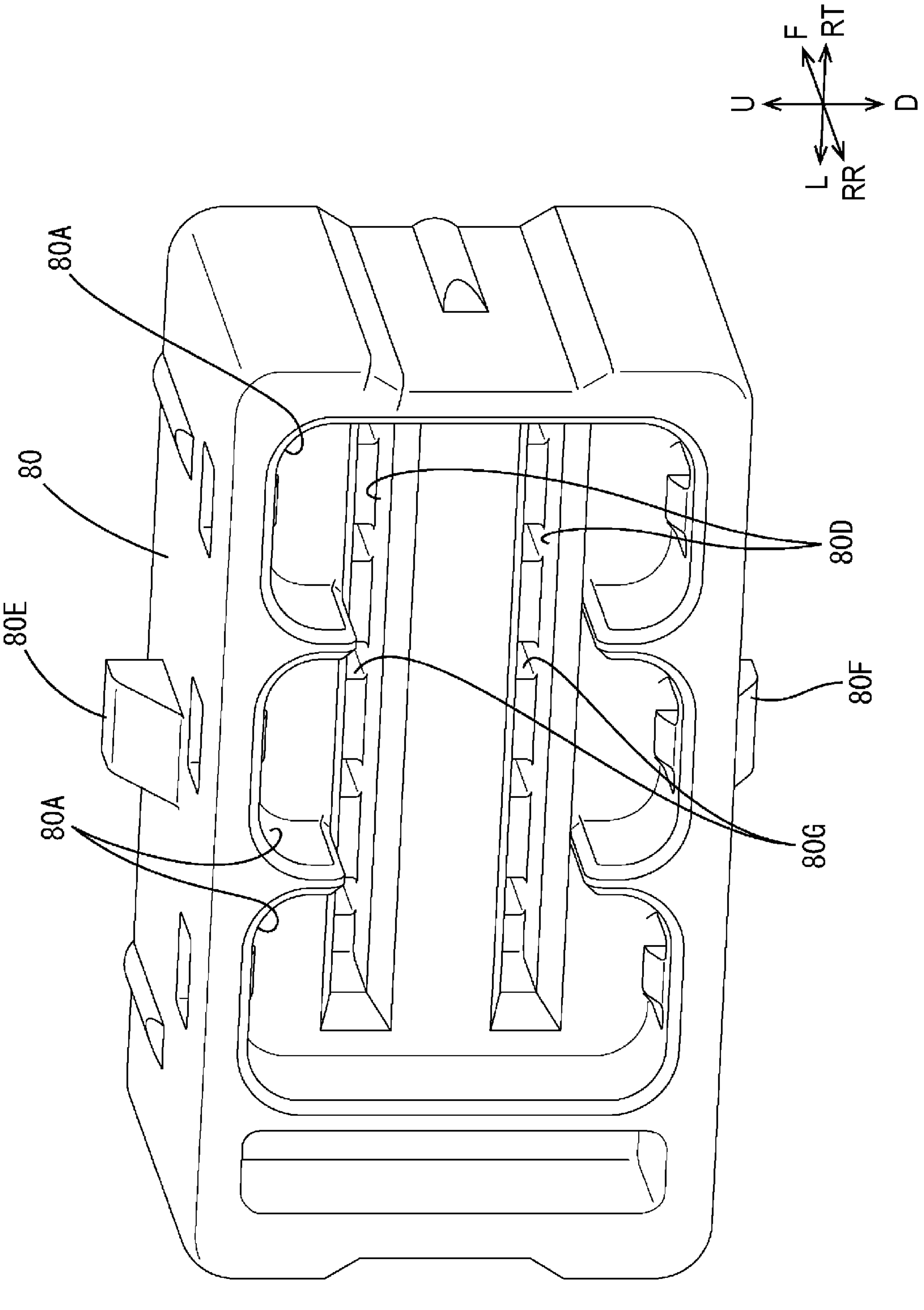
FIG. 8 is a perspective view of a holding member when viewed obliquely from a rear right upper side.

The holding member 80 is made of synthetic resin. As shown in FIG. 8, the holding member 80 is in the form of a block. Three accommodation recesses 80A are formed at fixed intervals in the lateral direction in the holding member 80. The accommodation recesses 80A are formed by recessing the front surface of the holding member 80 forward. A pair of upper and lower grooves 80D elongated in the lateral direction are formed in the holding member 80. The grooves 80D are recessed forward from back parts of the accommodation recesses 80. A plurality of press-fit holes 80G recessed forward are formed in back parts of the grooves 80D.

A lock protrusion 80E projecting upward is provided on an upper wall part of the holding member 80. The rear surface of the lock protrusion 80E is inclined upward toward the front, and the front surface is upright in the vertical direction. A lock protrusion 80F projecting downward is provided on a lower wall part of the holding member 80. The rear surface of the lock protrusion 80E is inclined downward toward the front, and the front surface is upright in the vertical direction.

Figure 9:
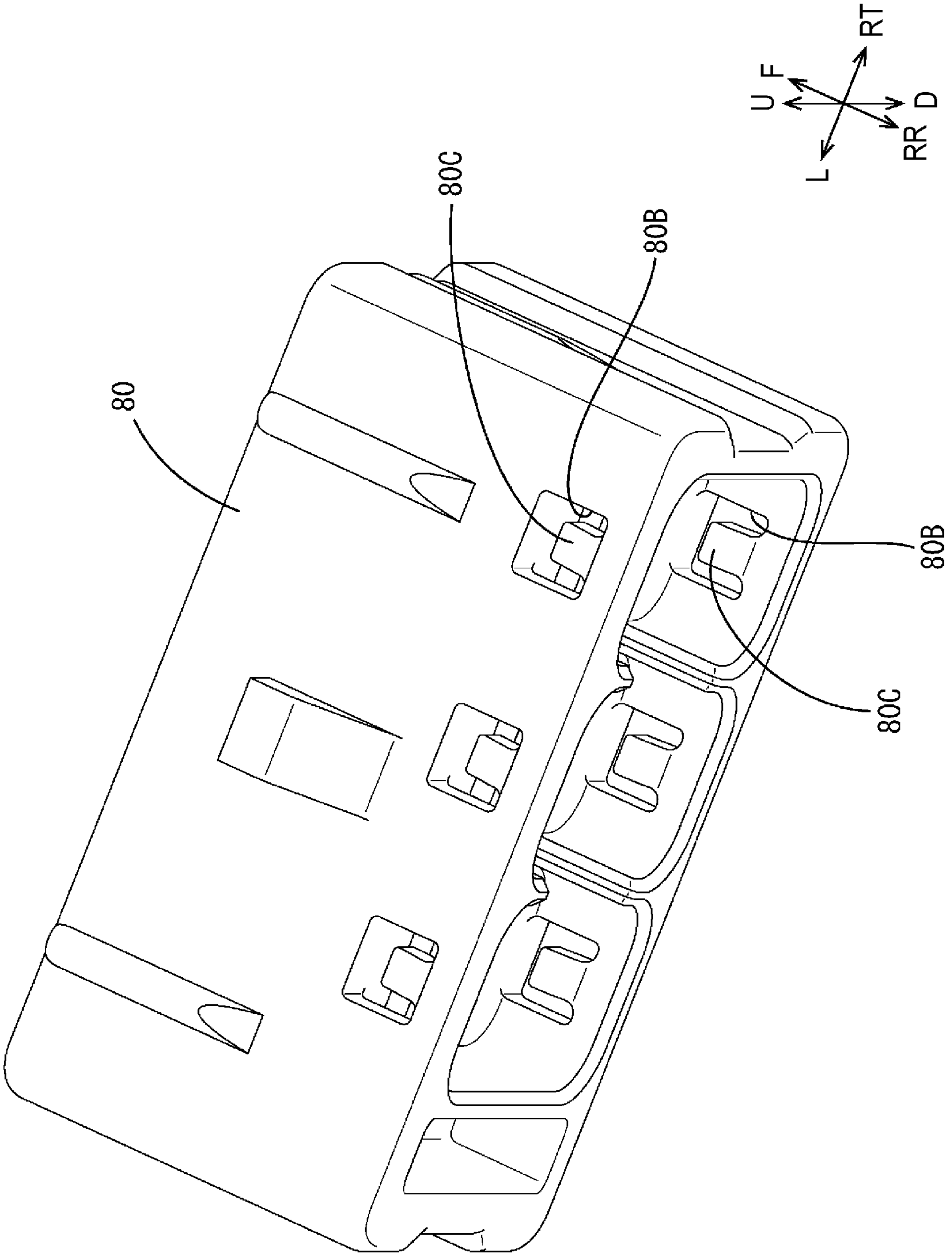
FIG. 9 is a perspective view of the holding member when viewed obliquely from a rear right upper side.

As shown in FIG. 9, the upper and lower wall parts are formed with U-shaped slits 80B. These slits 80 penetrate from the outer surface of the holding member 80 to the accommodation recesses 80A in the vertical direction.

Out of the upper wall part, parts surrounded by the slits 80B function as pressing portions 80C cantilevered forward. The pressing portion 80C of the upper wall part is inclined obliquely downward from the rear end toward the back part of the accommodation recess 80A. That is, the pressing portion 80C of the upper wall part projects into the accommodation recess 80A. The pressing portion 80C of the upper wall part is resiliently deformable upward with the rear end of the pressing portion 80C as a fulcrum.

Out of the lower wall part, parts surrounded by the slits 80B function as pressing portions 80C cantilevered forward. The pressing portion 80C of the lower wall part is inclined obliquely upward from the rear end toward the back part of the accommodation recess 80A. That is, the pressing portion 80C of the lower wall part projects into the accommodation recess 80A. The pressing portion 80C of the lower wall part is resiliently deformable downward with the rear end of the pressing portion 80C as a fulcrum.

[Concerning Joint Terminal]

The joint terminal 50 is formed by stamping a metal flat plate material. As shown in FIG. 1, the joint terminal 50 includes a base portion 50A, three tabs 50B and five press-fit portions 50C. The base portion 50A extends in the lateral direction with a plate thickness direction oriented in the vertical direction. The three tabs 50B extend rearward from a rear long side of the base portion 50A while being arranged at fixed intervals in the lateral direction. Each of these tabs 50B is individually connected to the terminal fitting 30 mounted in the housing 10. The five press-fit portions 50C extend forward from a front long side of the base portion 50A while being arranged at fixed intervals in the lateral direction. One joint terminal 50 is inserted into each groove 80D via the three accommodation recesses 80A (see FIG. 7). The press-fit portions 50C of each joint terminal 50 are press-fit one by one into the press-fit holes (see FIG. 7). In this way, the joint terminals 50 are retained in the grooves 80D.

[Concerning Ferrite Core]

As shown in FIG. 1, the ferrite core 20 is in the form of a vertically long block as a whole. The ferrite core 20 has a front-back symmetrical shape. The ferrite core 20 is accommodated into the accommodation recess 80A from behind the holding member 80 (see FIG. 7). At this time, the upper and lower surfaces of the ferrite core 20 are pressed by the pressing portions 80C by being contacted by tip parts of the pressing portions 80C (see FIG. 7). In this way, the ferrite core 20 is held accommodated in the accommodation recess 80A. The ferrite core 20 is formed with a pair of upper and lower insertion holes 20A penetrating in the front-rear direction. With the ferrite core 20 accommodated in the accommodation recess 80A, the tabs 50B are inserted into the respective insertion holes 20A and front end parts of the tabs 50B project forward of the ferrite core 20 (see FIG. 7). That is, the ferrite cores 20 are externally fit to the tabs 50B of the joint terminals 50. Each ferrite core 20 exhibits a filter function of preventing the propagation of electromagnetic noise from the tab 50B passed through one insertion hole 20A to the tab 50B passed through the other insertion hole 20A.

[Assembly Procedure of Joint Connector]

Next, an example of an assembly procedure of the joint connector 1 is described. First, the retainer 70 is mounted to the housing 10. Specifically, the guide portions 70A of the retainer 70 are inserted into the mounting groove 14 along the recessed surface portions 17 of the housing 10 from below the housing 10. Then, the guide portions 70A are locked to the temporary locking portions 18 (see FIG. 5). In this way, the retainer 70 is held at the temporary locking position.

Figure 10:
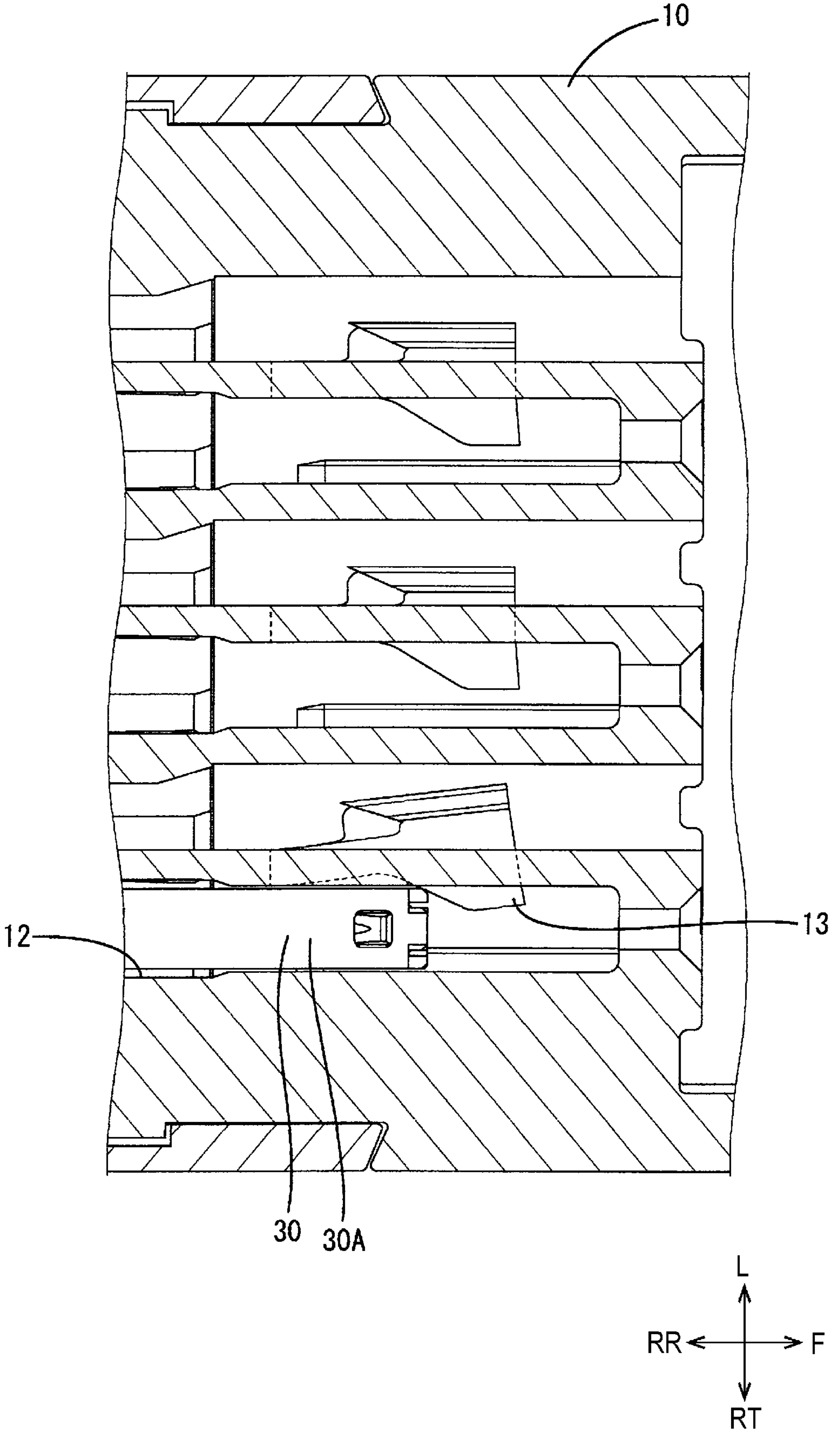
FIG. 10 is a section along A-A in FIG. 2 showing a state while a terminal fitting is being inserted into a cavity.

Subsequently, the terminal fitting 30 fixed to an end of the wire W is inserted into the cavity 12 of the housing 10 from behind the cavity 12 (see FIG. 10). In the process of inserting the terminal fitting 30 into the cavity 12, the front end of the connecting portion 30A butts against the locking lance 13 (see FIG. 10). Then, the locking lance 13 is deflected and deformed leftward (see FIG. 10).

Figure 11:
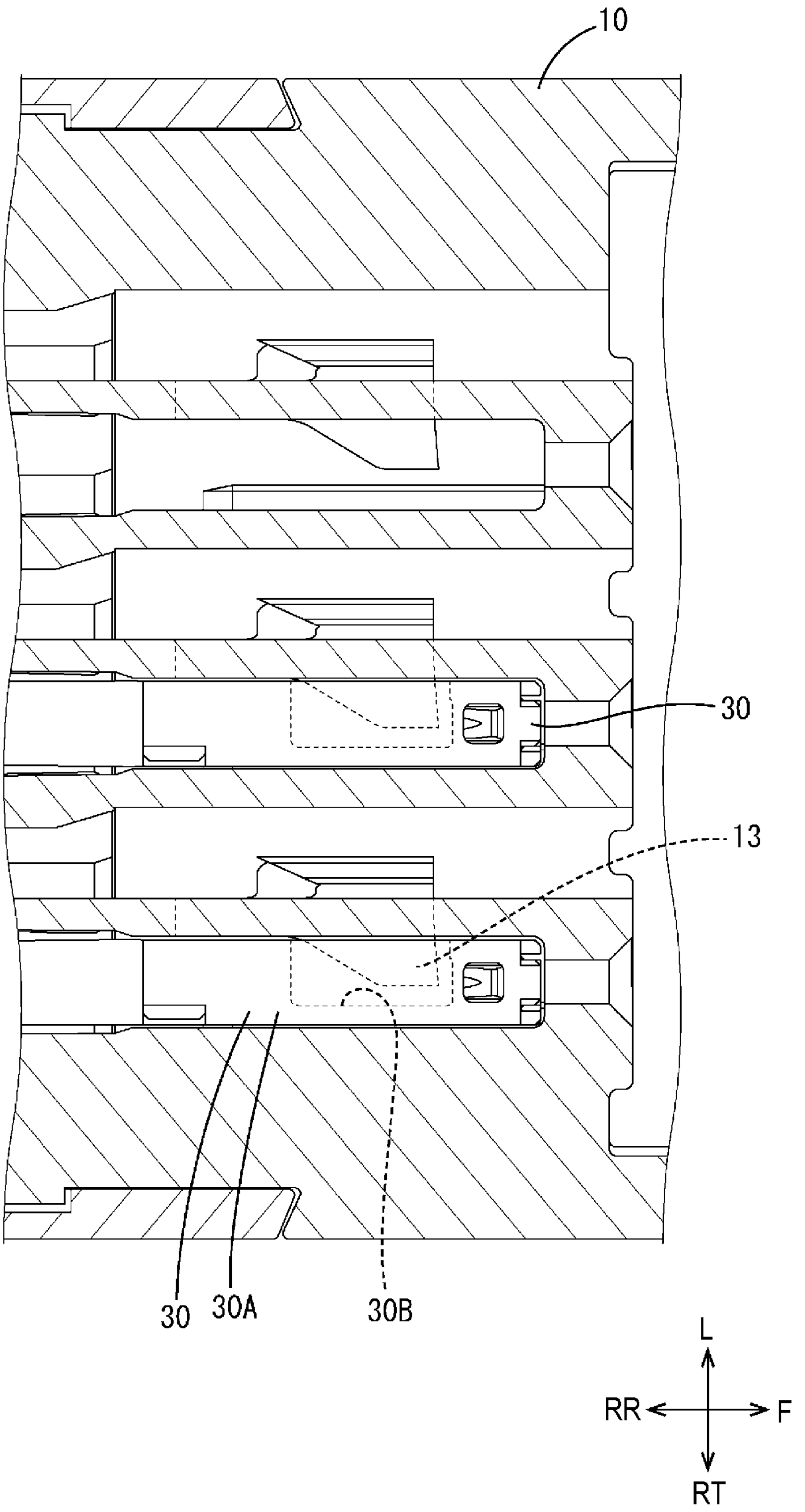
FIG. 11 is a section along A-A in FIG. 2 showing a state where the insertion of the terminal fitting into the cavity is completed.

If the terminal fitting 30 is inserted to a proper position in the cavity 12, the locking recess 30B is arranged to the right of the locking lance 13 (see FIG. 11). Then, the locking lance 13 is restored and enters the locking recess 30B of the connecting portion 30A from left (see FIG. 11). In this way, even if the terminal fitting 30 is moved rearward, the locking lance 13 is locked to the locking recess 30B and the terminal fitting 30 is primarily locked in a retained state. In this way, the plurality of terminal fittings 30 are inserted into the housing 10 from behind the housing 10 and retained by the locking action of the plurality of locking lances 13.

After the insertion of all the terminal fittings 30 into the cavities 12 is completed, the retainer 70 held at the temporary locking position is moved to the complete locking position. If the retainer 70 is pushed upward from the temporary locking position, the guide portions 70A are locked to the complete locking portions 19 (see FIG. 6). In this way, the retainer 70 is held at the complete locking position. At this time, the retaining portions 70B of the retainer 70 move to the vertical central parts of the cavities 12 to reach the advanced state, and the insertion restricting portions 70C move to the vertical central parts of the jig insertion chambers 16 to reach the advanced state (see FIG. 6). If the retainer 70 is in the advanced state, the retaining portions 70B lock the rear ends of the connecting portions 30A of the terminal fittings 30 (see FIG. 7). The retainer 70 held at the complete locking position in this way locks the terminal fittings 30 inserted to the proper positions in the cavities 12 and secondarily locks the terminal fittings 30 in the retained state. At this time, the jig contact portions 13A of the locking lances 13 are arranged between the terminal fittings 30 adjacent in the lateral direction (first direction) (see FIG. 11).

At this time, the plurality of terminal fittings 30 are arranged side by side along the first direction (lateral direction) orthogonal to the front-rear direction and separately in two rows in the vertical direction (second direction) orthogonal to the front-rear direction and lateral direction (see FIG. 7). A pair of the terminal fittings 30 arranged along the vertical direction constitute one differential pair transmission line P (see FIG. 7).

Subsequently, the joint terminals 50 are mounted into the holding member 80. Specifically, the two joint terminals 50 are inserted one by one into the respective grooves 80D of the holding member 80 via the three accommodation recesses 80A (see FIG. 7). Then, the press-fit portions 50C of each joint terminal 50 are press-fit one by one into the press-fit holes 80G (see FIG. 7). In this way, the holding member 80 holds the joint terminals 50 while preventing the joint terminals 50 from coming out from the grooves 80D.

Subsequently, the ferrite cores 20 are mounted into the holding member 80. Specifically, the ferrite core 20 is oriented such that the pair of insertion holes 20A are arranged in the vertical direction. Then, the tab 50B of the upper joint terminal 50 is inserted into the upper insertion hole 20A, out of the pair of insertion holes 20A, and the tab 50B of the lower joint terminal 50 is inserted into the lower insertion hole 20A, out of the pair of insertion holes 20A (see FIG. 7). Then, the ferrite core 20 is accommodated into the accommodation recess 80A. The ferrite core 20 accommodated into the accommodation recess 80A is pressed from above and below by the press-fit portions 80C and held accommodated in the accommodation recess 80A (see FIG. 7).

Subsequently, the holding member 80 is mounted into the housing 10. Specifically, the holding member 80 is inserted into the receptacle 10A of the housing 10 from the front of the receptacle 10A (see FIG. 7). At this time, the tabs 50B of the joint terminals 50 are first inserted into the connecting portions 30A of the terminal fittings 30 mounted into the housing 10 from front. That is, the joint terminals 50 are mounted into the housing 10 from front. In this way, the plurality of terminal fittings 30 are made conductive.

Figure 12:
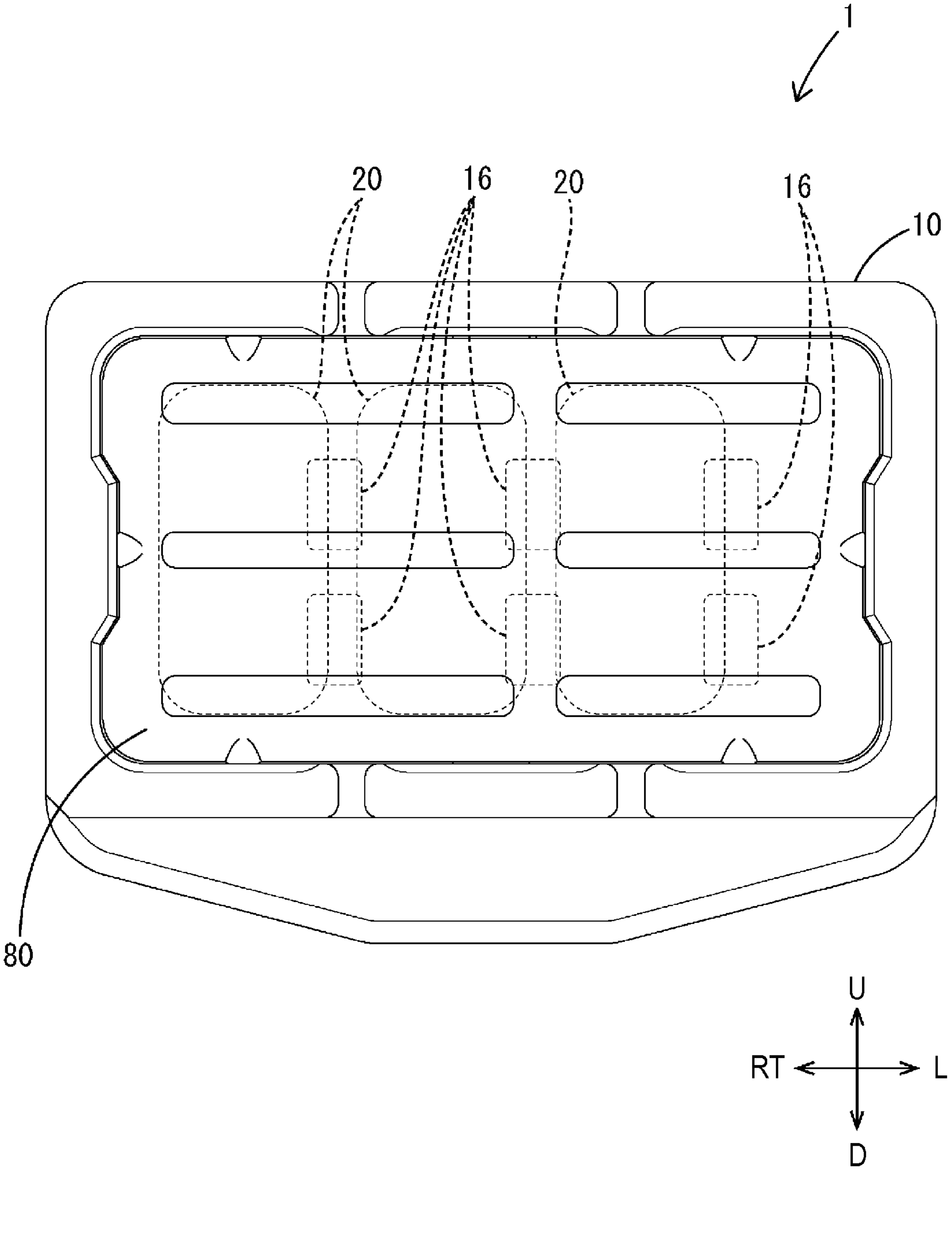
FIG. 12 is a front view of the joint connector of the embodiment.

Subsequently, the holding member 80 is inserted into the receptacle 10A from front. Then, the respective lock protrusions 80E, 80F of the holding member 80 are locked into the lock holes 10B, 10C of the receptacle 10A (see FIG. 7). That is, the holding member 80 is mounted into the housing 10 to cover the front surface of the housing 10. In this way, the assembly of the joint connector 1 is completed. As shown in FIG. 12, in a front view of the housing 10 of the joint connector 1, parts of the ferrite cores 20 and at least parts of the jig insertion chambers 16 are arranged to overlap. One ferrite core 20 is mounted on a pair of the tabs 50B to be connected to the pair of terminal fittings 30 constituting the differential pair transmission line P (see FIG. 7).

[Withdrawal Procedure of Terminal Fitting]

Next, an example of a procedure of withdrawing the terminal fitting 30 from the housing 10 is described. First, the retainer 70 held at the complete locking position is moved to the temporary locking position with the joint terminals 50 and the holding member 80 mounted in the housing 10. Then, the retaining portions 70B of the retainer 70 in the advanced state are retracted and the insertion restricting portions 70C in the advanced state are retracted (see FIG. 5). In this way, the jig 90 is allowed to contact the jig contact portion 13A of the locking lance 13.

Figure 13:
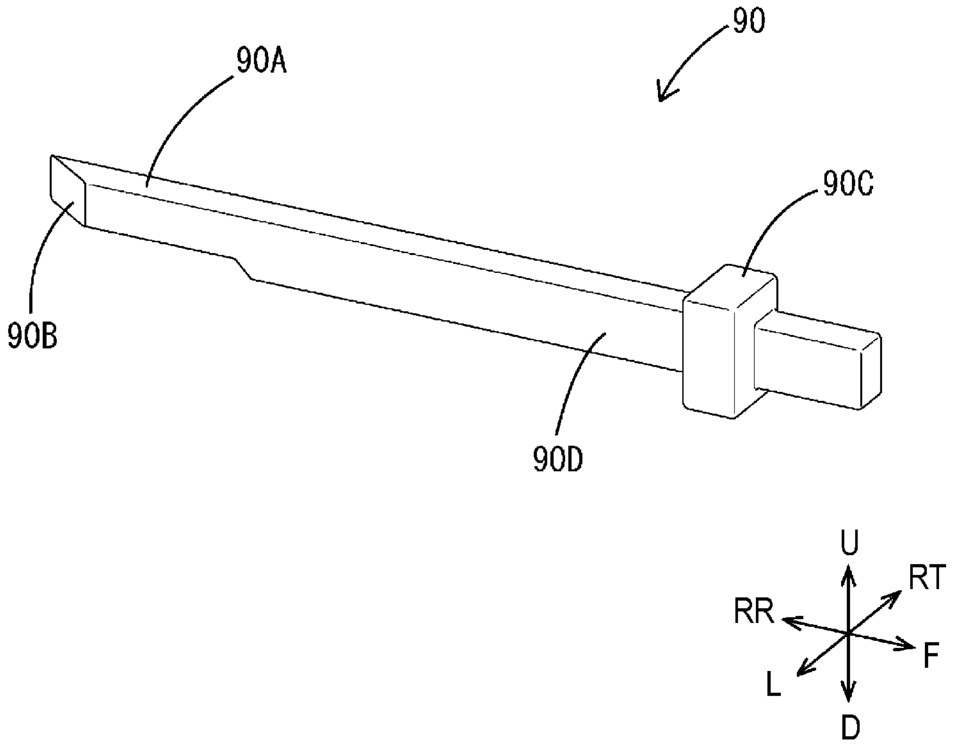
FIG. 13 is a perspective view of a jig when viewed obliquely from a front left upper side.
Figure 14:
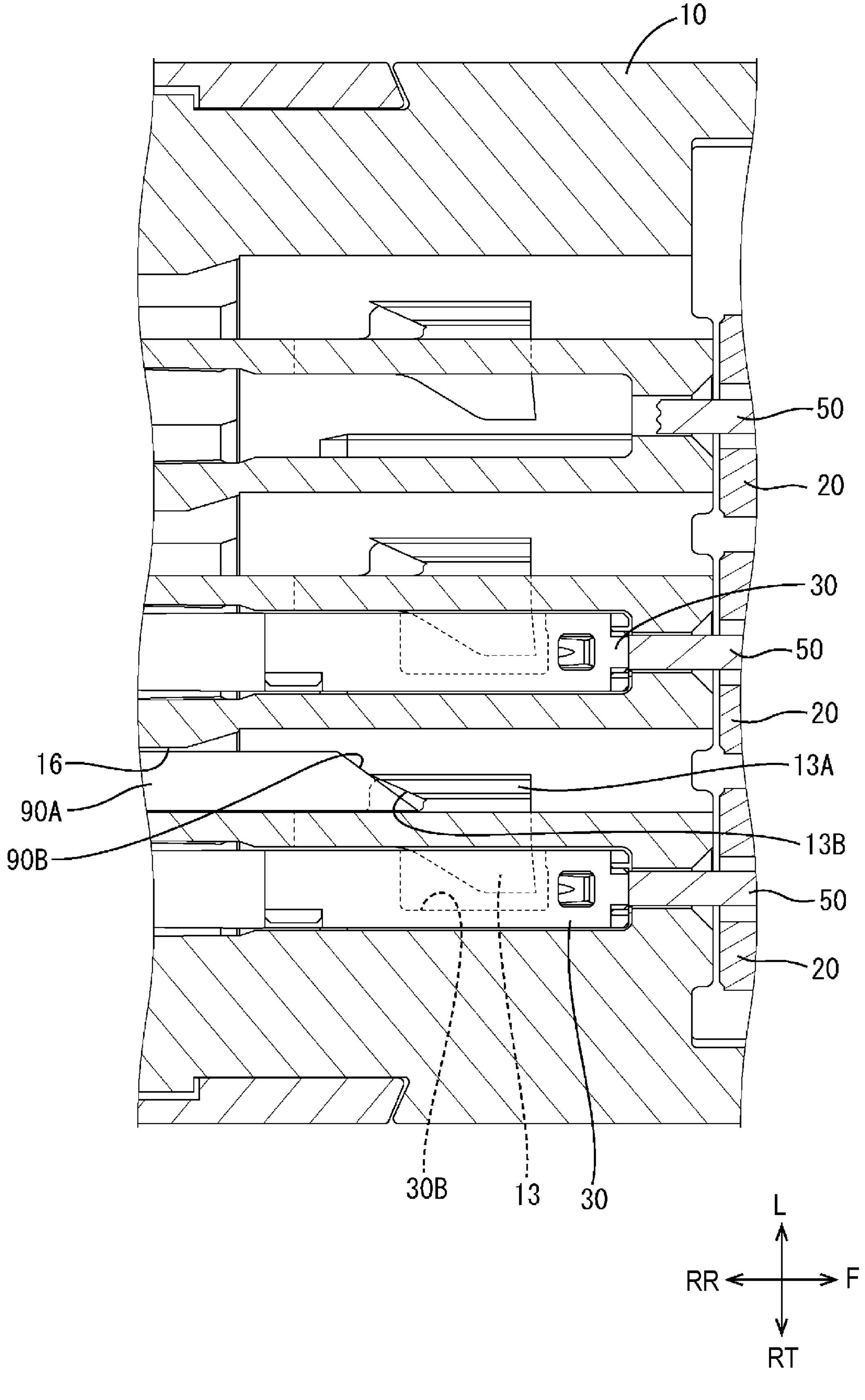
FIG. 14 is a section along A-A in FIG. 2 showing a state while the jig is being inserted into a jig insertion chamber.
Figure 15:
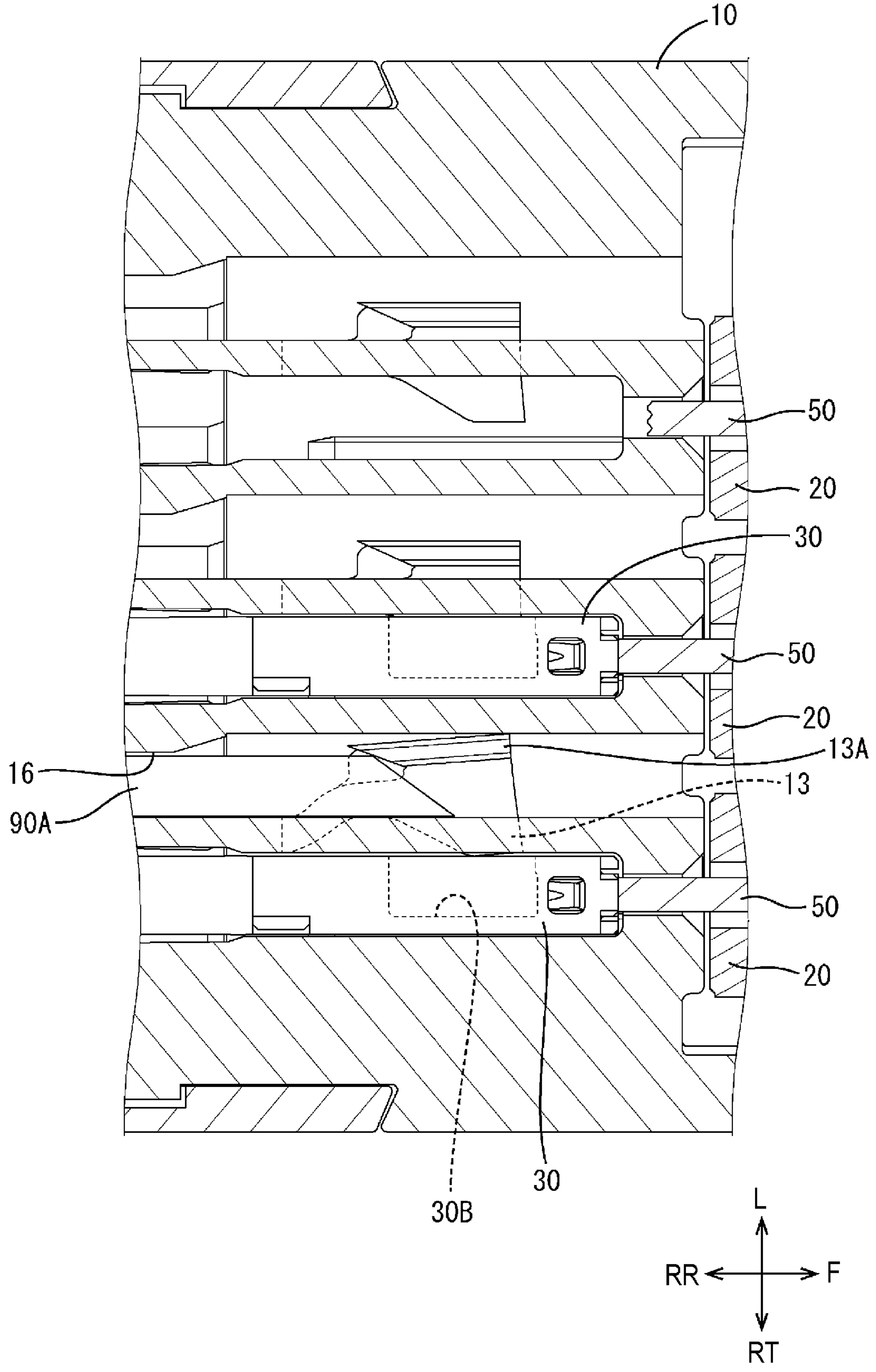
FIG. 15 is a section along A-A in FIG. 2 showing a state where a locking lance is disengaged from the terminal fitting by the jig inserted into the jig insertion chamber.

Subsequently, the jig 90 is inserted into the jig insertion chamber 16 from behind the jig insertion chamber 16. As shown in FIG. 13, the jig 90 has a shape elongated in the front-rear direction. A cross-sectional shape of the jig 90 orthogonal to the front-rear direction is a rectangular shape long in the vertical direction. A tip part 90A (i.e. a side to be inserted into the jig insertion chamber 16) of the jig 90 is decentered upward with respect to a base end part 90D. The tip surface of the jig 90 is an inclined surface 90B inclined rightward toward a tip. The base end part 90D of the jig 90 is provided with a radially projecting flange portion 90C to facilitate gripping.

The tip part 90A of the jig 90 is inserted into the jig insertion chamber 16 from behind the housing 10. Then, the tip part 90A is guided to a right side of the jig contact portion 13A by the inclined surface 90B of the jig 90 and the guide surface 13B of the jig contact portion 13A (see FIG. 14). If the jig 90 is further inserted into the jig insertion chamber 16, the tip part 90A of the jig 90 pushes the jig contact portion 13A leftward of the jig insertion chamber 16 (see FIG. 15). Along with this, the locking lance 13 is resiliently deformed leftward and displaced leftward of the connecting portion 30A from the locking recess 30B (see FIG. 15). In this way, the locking lance 13 is disengaged from the terminal fitting 30. A displacement direction when the locking lance 13 is disengaged from the terminal fitting 30 is a direction parallel to the lateral direction (first direction). In this way, the terminal fitting 30 is released from primary locking by the locking lance 13 and can be withdrawn rearward through the rear surface of the housing 10.

Next, functions and effects of this embodiment are described.

The joint connector 1 of the present disclosure is provided with the housing 10, the plurality of terminal fittings 30, the joint terminals 50 and the holding member 80. The housing 10 includes the plurality of locking lances 13. The plurality of terminal fittings 30 are inserted into the housing 10 from behind the housing 10 and retained by the locking action of the plurality of locking lances 13. The joint terminals 50 are mounted into the housing 10 from front to make the plurality of terminal fittings 30 conductive. The holding member 80 holds the joint terminals 50 and is mounted into the housing 10 to cover the front surface of the housing 10. The jig insertion chambers 16 open in the rear surface of the housing 10 are formed in the housing 10, and the locking lances 13 include the jig contact portions 13A arranged in the jig insertion chambers 16. According to this configuration, in releasing the terminal fitting 30 locked by the locking lance 13, the jig 90 inserted into the jig insertion chamber 16 from behind the housing 10 is brought into contact with the jig contact portion 13A of the locking lance 13 to displace the locking lance 13 in a direction to disengage the locking lance 13 from the terminal fitting 30. Since the holding member 80 needs not be removed from the housing 10, workability is excellent.

The jig contact portion 13A of the joint connector 1 of the present disclosure is formed with the guide surface 13B inclined with respect to the front-rear direction. According to this configuration, the jig 90 inserted into the jig insertion chamber 16 can be prevented from butting against the jig contact portion 13A.

The retainer 70 displaceable between the temporary locking position for allowing the insertion of the terminal fittings 30 into the housing 10 and the complete locking position for retaining the terminal fittings 30 inserted into the housing 10 is mounted in the housing 10 of the joint connector 1 of the present disclosure. The retainer 70 is formed with the insertion restricting portions 70C. The insertion restricting portion 70C is located in the jig insertion chamber 16 to restrict the contact of the jig 90 with the jig contact portion 13A when the retainer 70 is at the complete locking position, and allows the contact of the jig 90 with the jig contact portion 13A when the retainer 70 is at the temporary locking position. There is a concern that a locked part of the terminal fitting 30 and the retainer 70 is deformed or broken if an attempt is made to release retention by the locking lance 13 and withdraw the terminal fitting 30 rearward with the retainer 70 located at the complete locking position. As a countermeasure against this, the retainer 70 is formed with the insertion restricting portions 70C. In this way, if the jig 90 is inserted into the jig insertion chamber 16 with the retainer 70 located at the complete locking position, the contact of the jig 90 with the jig contact portion 13A is restricted, wherefore an unlocking operation of the locking lance 13 cannot be performed. Therefore, an operation of withdrawing the terminal fitting 30 can be prevented with the retainer 70 kept at the complete locking position.

The joint terminal 50 of the joint connector 1 of the present disclosure includes the tabs 50B to be individually connected to the plurality of terminal fittings 30. The ferrite cores 20 are externally fit to the tabs 50B. In a front view of the housing 10, parts of the ferrite cores 20 and at least parts of the jig insertion chambers 16 are arranged to overlap. According to this configuration, intervals between the adjacent terminal fittings 30 are widened by forming the jig insertion chambers 16, but the ferrite cores 20 can be arranged, utilizing these widened intervals. Thus, enlargement caused by providing the ferrite cores 20 can be avoided.

In the joint connector 1 of the present disclosure, the plurality of terminal fittings 30 are arranged side by side along the lateral direction (first direction) orthogonal to the front-rear direction and separately in two rows in the vertical direction (second direction) orthogonal to the front-rear direction and lateral direction (first direction). The pair of terminal fittings 30 arranged along the vertical direction (second direction) constitute one differential pair transmission line P, and one ferrite core 20 is mounted on the pair of tabs 50B to be connected to the pair of terminal fittings 30 constituting the differential pair transmission line P. According to this configuration, the plurality of ferrite cores 20 can be arranged side by side in a row along the lateral direction and the layout of the ferrite cores 20 can be facilitated.

In the joint connector 1 of the present disclosure, the displacement direction when the locking lance 13 is disengaged from the terminal fitting 30 is a direction parallel to the lateral direction (first direction). According to this configuration, since an interval between the pair of terminal fittings 30 constituting the differential pair transmission line P can be narrowed, the ferrite core 20 can be reduced in size.

In the joint connector 1 of the present disclosure, the jig contact portion 13A is arranged between the terminal fittings 30 adjacent in the lateral direction (first direction). According to this configuration, since the intervals between the terminal fittings 30 adjacent in the lateral direction can be ensured, sufficient dimensions of the ferrite cores 20 in the lateral direction can be ensured while the mutual contact of the ferrite cores 20 arranged in the lateral direction is avoided. In this way, noise filter performance by the ferrite cores 20 can be enhanced.

Other Embodiments

The embodiment disclosed this time should be considered illustrative in all aspects, rather than restrictive. The scope of the present invention is not limited to the embodiment disclosed this time, but is represented by claims and intended to include all changes in the scope of claims and in the meaning and scope of equivalents.

Unlike the embodiment, the retainer may not include the insertion restricting portions.

Unlike the embodiment, the holding member may include a receptacle for surrounding the outer peripheral surface of the housing.

Unlike the embodiment, the ferrite cores may not be mounted on the joint terminals.

Unlike the embodiment, the displacement direction when the locking lance is disengaged from the terminal fitting may be a direction parallel to the second direction.

Unlike the embodiment, the jig contact portion may be arranged between the terminal fittings arranged in the second direction.

LIST OF REFERENCE NUMERALS

1 . . . joint connector
10 . . . housing
10A . . . receptacle
10B . . . lock hole
10C . . . lock hole
12 . . . cavity
13 . . . locking lance
13A . . . jig contact portion
13B . . . guide surface
14 . . . mounting groove
16 . . . jig insertion chamber
17 . . . recessed surface portion
18 . . . temporary locking portion
19 . . . complete locking portion
20 . . . ferrite core
20A . . . insertion hole
30 . . . terminal fitting
30A . . . connecting portion
30B . . . locking recess
30C . . . barrel portion
50 . . . joint terminal
50A . . . base portion
50B . . . tab
50C . . . press-fit portion
70 . . . retainer
70A . . . guide portion
70B . . . retaining portion
70C . . . insertion restricting portion
70D . . . through hole
80 . . . holding member
80A . . . accommodation recess
80B . . . slit
80C . . . pressing portion
80D . . . groove
80E . . . lock protrusion
80F . . . lock protrusion
80G . . . press-fit hole
90 . . . jig
90A . . . tip part
90B . . . inclined surface
90C . . . flange portion
90D . . . base end part
P . . . differential pair transmission line
W . . . wire

What is claimed is:

1. A joint connector, comprising:

a housing including a plurality of locking lances;

a plurality of terminal fittings to be inserted into the housing from behind the housing, the plurality of terminal fittings being retained by a locking action of the plurality of locking lances;

a joint terminal to be mounted into the housing from front, the joint terminal making the plurality of terminal fittings conductive; and a holding member for holding the joint terminal, the holding member being mounted into the housing to cover a front surface of the housing, jig insertion chambers open in a rear surface of the housing being formed in the housing, and the locking lance including a jig contact portion arranged in the jig insertion chamber.

2. The joint connector of claim 1, wherein the jig contact portion is formed with a guide surface inclined with respect to a front-rear direction.

3. The joint connector of claim 1, wherein:

a retainer displaceable between a temporary locking position for allowing the terminal fittings to be inserted into the housing and a complete locking position for retaining the terminal fittings inserted into the housing is mounted in the housing, and the retainer is formed with insertion restricting portions for restricting contact of a jig with the jig contact portion by being located in the jig insertion chamber when the retainer is at the complete locking position and allowing the contact of the jig with the jig contact portion when the retainer is at the temporary locking position.

4. The joint connector of claim 1, wherein:

the joint terminal includes tabs to be individually connected to the plurality of terminal fittings, and ferrite cores are externally fit to the tabs and parts of the ferrite cores and at least parts of the jig insertion chambers are arranged to overlap in a front view of the housing.

5. The joint connector of claim 4, wherein:

the plurality of terminal fittings are arranged side by side along a first direction orthogonal to a front-rear direction and separately in two rows in a second direction orthogonal to the front-rear direction and the first direction, and a pair of the terminal fittings arranged along the second direction constitute one differential pair transmission line and one ferrite core is mounted on a pair of the tabs to be connected to the pair of terminal fittings constituting the differential pair transmission line.

6. The joint connector of claim 5, wherein a displacement direction when the locking lance is disengaged from the terminal fitting is a direction parallel to the first direction.

7. The joint connector of claim 6, wherein the jig contact portion is arranged between the terminal fittings adjacent in the first direction.

* * * * *